(12) United States Patent
Assouad et al.

(10) Patent No.: US 7,746,629 B2
(45) Date of Patent: Jun. 29, 2010

(54) METHOD AND SYSTEM FOR COUPLING A LAPTOP OR OTHER PORTABLE OR HAND-HELD DEVICE TO A DOCKING SYSTEM USING AN ETHERNET INTERFACE

(76) Inventors: Simon Assouad, 22 Vermillion, Irvine, CA (US) 92603; Vinod Lakhani, 1 Leicester Ct., Laguna Niguel, CA (US) 92677

( * ) Notice: Subject to any disclaimer, the term of this patent is extended or adjusted under 35 U.S.C. 154(b) by 88 days.

(21) Appl. No.: 11/669,697

(22) Filed: Jan. 31, 2007

(65) Prior Publication Data
US 2008/0104301 A1   May 1, 2008

Related U.S. Application Data

(60) Provisional application No. 60/863,823, filed on Nov. 1, 2006.

(51) Int. Cl.
*G06F 1/16* (2006.01)
(52) U.S. Cl. .................................. 361/679.31; 710/303
(58) Field of Classification Search ................ 361/686; 710/303–304
See application file for complete search history.

(56) References Cited

U.S. PATENT DOCUMENTS

| | | | |
|---|---|---|---|
| 6,375,344 B1 | 4/2002 | Hanson et al. | |
| 6,483,697 B1* | 11/2002 | Jenks et al. | 361/683 |
| 6,648,652 B2* | 11/2003 | Nakano et al. | 439/55 |
| 7,025,627 B2* | 4/2006 | Rosenthal et al. | 439/501 |
| 7,038,906 B2* | 5/2006 | Hubbard | 361/683 |
| 7,107,380 B1* | 9/2006 | Mohan | 710/303 |
| 7,200,702 B2* | 4/2007 | Keely et al. | 710/303 |
| 7,285,021 B2* | 10/2007 | Bell et al. | 439/623 |
| 7,376,779 B2* | 5/2008 | Chu | 710/313 |
| 2005/0055487 A1* | 3/2005 | Tanaka et al. | 710/303 |
| 2006/0127034 A1* | 6/2006 | Brooking et al. | 386/46 |
| 2006/0159070 A1* | 7/2006 | Deng | 370/352 |
| 2006/0286825 A1* | 12/2006 | Ho et al. | 439/65 |

(Continued)

FOREIGN PATENT DOCUMENTS

EP    1726918 A1 * 11/2006

OTHER PUBLICATIONS

Trendware International, Inc. User's Guide for TU-ET200 USB 2.0 Mobile Docking Station, Mar. 11, 2004.*

*Primary Examiner*—Michael C Zarroli
(74) *Attorney, Agent, or Firm*—McAndrews Held & Malloy, Ltd.

(57) ABSTRACT

Methods and systems for coupling a laptop or other portable or hand-held device to a docking system using an Ethernet Interface are disclosed and may comprise interfacing a portable computing device to a docking station using an Ethernet interface. Power may be applied from the docking station to the portable computing device via the Ethernet interface using power over Ethernet (POE) protocol. Audio, video, multimedia, control and/or data signals may be communicated between the docking station and the portable computing device via the Ethernet interface. Data exchanged between the portable computing device and the docking station may be encapsulated in Ethernet frames and tagged appropriately. The interface may be accomplished by directly coupling an Ethernet port of the docking station to an Ethernet port of the portable computing device, or by utilizing an Ethernet cable. The docking station may be an active or passive docking station.

118 Claims, 6 Drawing Sheets

U.S. PATENT DOCUMENTS

2007/0121548 A1* 5/2007 Manis et al. ................. 370/330
2007/0192814 A1* 8/2007 Southerland et al. ......... 725/105
2007/0250872 A1* 10/2007 Dua ............................ 725/81
2007/0257780 A1* 11/2007 Schindler ................ 340/310.11
2008/0031270 A1* 2/2008 Tran et al. ................... 370/419
2008/0288702 A1* 11/2008 Diab et al. .................. 710/304

* cited by examiner

FIG. 6

METHOD AND SYSTEM FOR COUPLING A LAPTOP OR OTHER PORTABLE OR HAND-HELD DEVICE TO A DOCKING SYSTEM USING AN ETHERNET INTERFACE

CROSS-REFERENCE TO RELATED APPLICATIONS/INCORPORATION BY REFERENCE

This application makes reference to and claims priority to U.S. Provisional Application Ser. No. 60/863,823, filed on Nov. 1, 2006, entitled "METHOD AND SYSTEM FOR COUPLING A LAPTOP TO A DOCKING SYSTEM USING AN ETHERNET INTERFACE," which is hereby incorporated herein by reference in its entirety.

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to computer interfaces. More specifically, certain embodiments of the invention relate to a method and system for coupling a laptop or other portable or hand-held device to a docking system using an Ethernet Interface.

BACKGROUND OF THE INVENTION

A docking station is a computer peripheral that allows a user to utilize a portable computing device, a laptop computer, for example, on a desktop. The docking station may perform various functions through various ports on the portable computing device such as an external keyboard, an external mouse, a video connection to a desktop monitor, power and network communications.

In current systems, different laptops may require the use of different docking stations. This may be the result of differences in features, differences in design, differences in connectors, device size and so on. As a result of these differences, a user that upgrades a laptop PC will most likely have to purchase a new docking station in order to dock their new laptop PC. As more and more features are being placed in the docking station, the cost of purchasing a new docking station also increases. Hence, while it may be reasonable to purchase a passive docking station, it may be prohibitively expensive to purchase a new docking station with, for example, the upgrade of a new laptop.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for coupling a laptop or other portable or hand-held device to a docking system using an Ethernet Interface, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for coupling a laptop or other portable or hand-held device to a docking system using an Ethernet interface. Aspects of the invention may comprise interfacing a portable computing device to a docking station using an Ethernet interface. Power may be applied from the docking station to the portable computing device via the Ethernet interface using power over Ethernet (POE) protocol. Audio, video, multimedia, control and/or data signals may be communicated between the docking station and the portable computing device via the Ethernet interface. Data exchanged between the portable computing device and the docking station may be encapsulated in Ethernet frames and tagged appropriately. The interface may be accomplished by directly coupling an Ethernet port of the docking station to an Ethernet port of the portable computing device, or by utilizing an Ethernet cable. The docking station may be an active docking station or a passive docking station. The Ethernet link may be established at 10 Mbps, 100 Mbps, 1 Gbps, 2.5 Gbps, 10 Gbps, or other suitable speeds.

Figure 1:
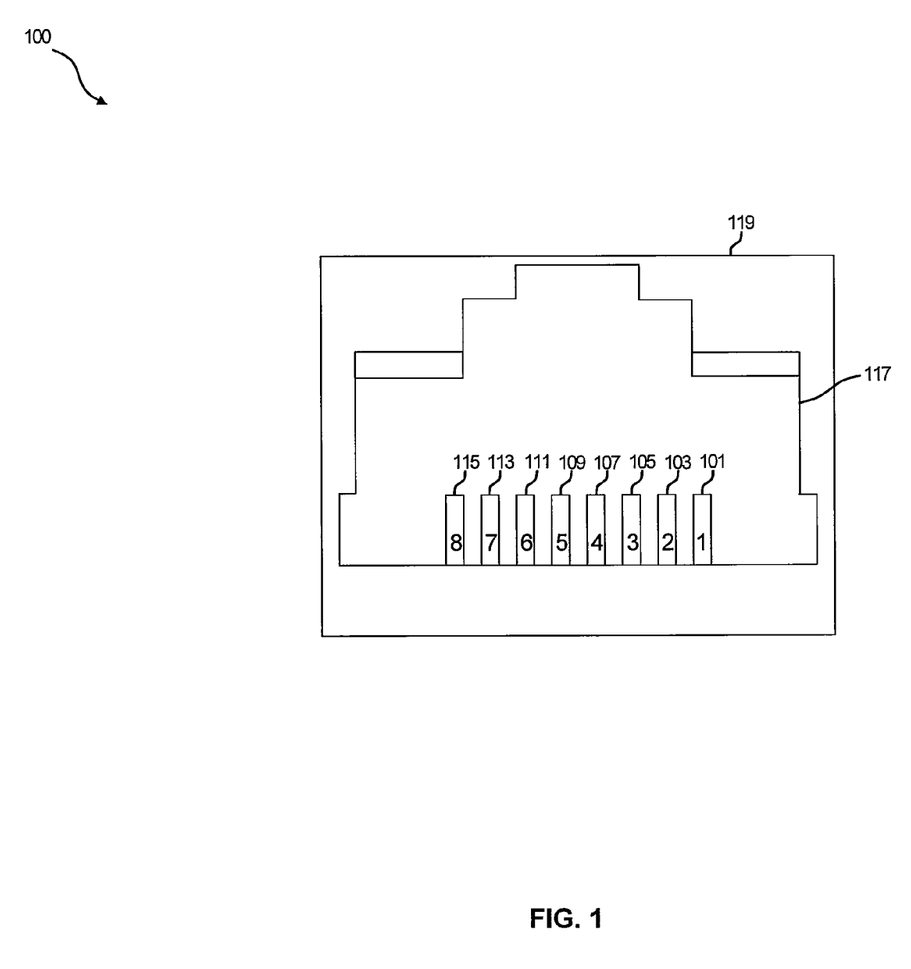
FIG. 1 is a block diagram of an exemplary Ethernet connector in connection with an embodiment of the invention.

FIG. 1 is a block diagram of an exemplary Ethernet connector in connection with an embodiment of the invention. Referring to FIG. 1, there is shown an Ethernet connector 100 comprising a connector body 119, a connector socket 117, and connector contact pins 101, 103, 105, 107, 109, 111, 113 and 115, also labeled as 1, 2, 3, 4, 5, 6, 7 and 8, respectively in FIG. 1. In an exemplary embodiment of the invention, data signals may be communicated utilizing pin pairs 1 and 2 and/or 3 and 6. Pins 4, 5, 7 and 8 may be unused, depending on the Ethernet protocol and the link speed.

In operation, an Ethernet cable with a suitable plug, such as an RJ45 plug, for example, may be inserted into the connector socket 117 of the Ethernet connector 100. Data communicated through the Ethernet connector 100 may be IEEE Ethernet standard compliant.

Figure 2:
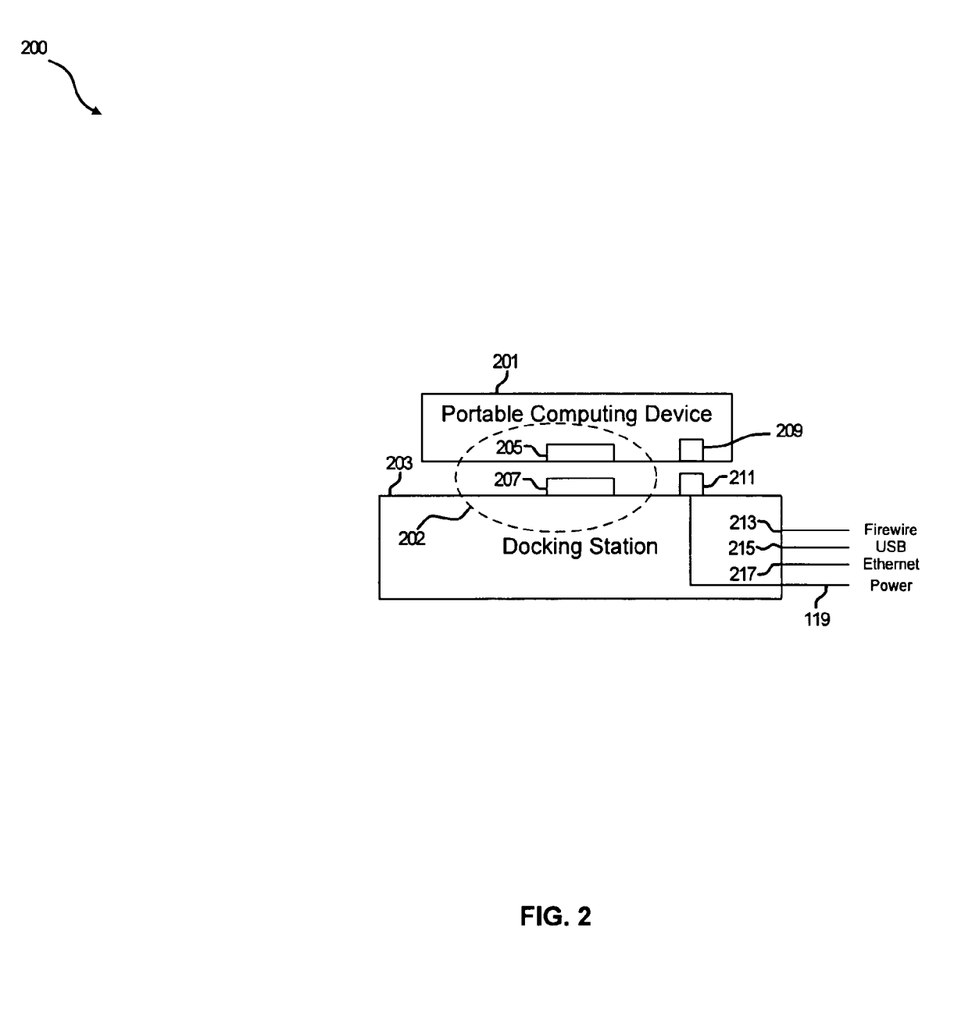
FIG. 2 is a block diagram that illustrates coupling of a portable computing device to a docking station using an Ethernet Interface 202 with a connector and a separate power connector, in accordance with an embodiment of the invention.

FIG. 2 is a block diagram that illustrates coupling of a portable computing device to a docking station using an Ethernet Interface 202 with a connector and a separate power connector, in accordance with an embodiment of the invention. Referring to FIG. 2, there is shown a portable computing device docking station configuration 200 comprising a portable computing device 201, a docking station 203, a portable computing device Ethernet connection 205, a docking station Ethernet connection 207, a portable computing device power connection 209, a docking station power connector 211, and docking station Firewire, USB, Ethernet, and power ports, 213, 215, 217 and 219, respectively. A portable computing device may comprise any portable or hand-held device having computing or communication capabilities, such as, for example, a laptop, a PDA, a cell phone, a two-way messaging device, an MP3 player, a gaming device, etc. The docking station 203 may comprise suitable circuitry, logic and/or code to accept signals from the Firewire, USB, Ethernet, and/or power ports 213, 215, 217 and 219, respectively, and communicate these signals to the portable computing device 201. Utilizing an Ethernet port may avoid the need for dedicated docking connectors on the portable computing device 201 and the docking station 203.

In operation, the portable computing device 201 may be coupled to the docking station 203 utilizing the portable computing device Ethernet connection 205 and the docking station Ethernet connection 207. Data communicated over the Ethernet connections 205 and 207 may adhere to the IEEE Ethernet standard. In accordance with an embodiment of the invention, information comprising control data and/or regular data flowing between the portable computing device 201 and the docking station 203 via the portable computing device Ethernet connection 205 and docking station Ethernet connection 207 may be packetized into Ethernet frames, which may carry text, video, voice and/or multi-media information. Power may be supplied to the portable computing device 201 via the portable computing device power connection 109 and docking station power connector 211.

Figure 3:
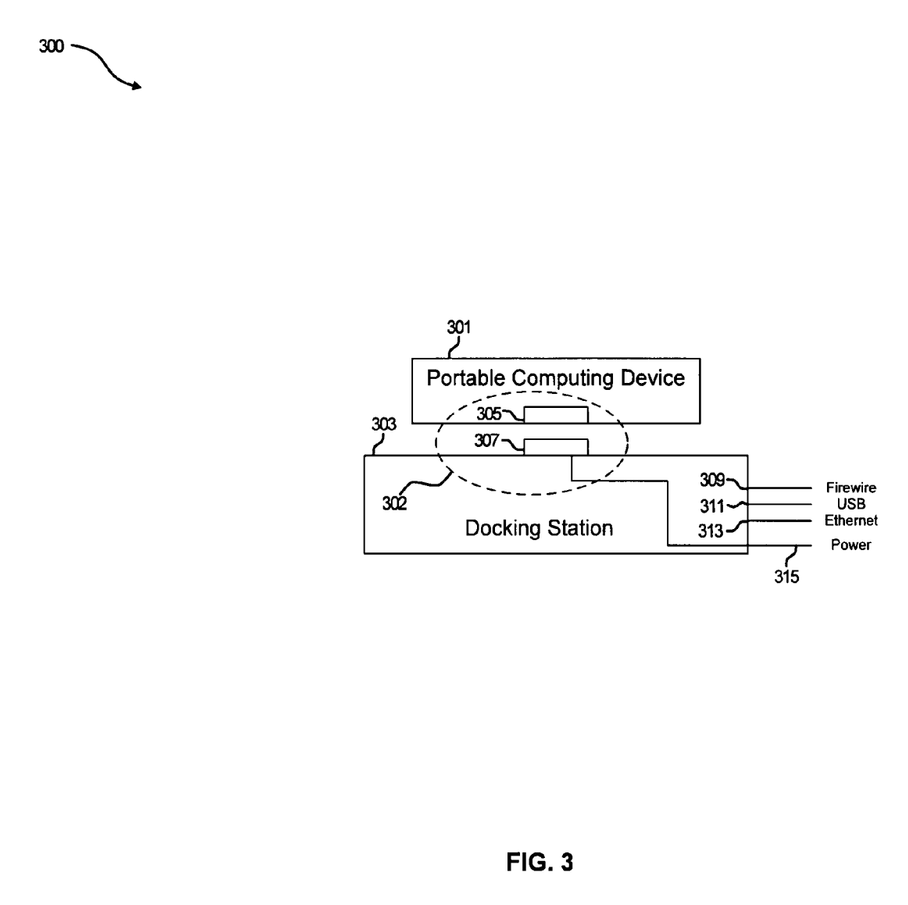
FIG. 3 is a block diagram that illustrates coupling of a portable computing device to a docking station using an Ethernet Interface 302 with a connector in which power is supplied via the Ethernet interface 302, in accordance with an embodiment of the invention.

FIG. 3 is a block diagram that illustrates coupling of a portable computing device to a docking station using an Ethernet Interface 302 with a connector in which power is supplied via the Ethernet interface, in accordance with an embodiment of the invention. Referring to FIG. 3, there is shown a portable computing device docking station configuration 300 comprising a portable computing device 301, a docking station 303, a portable computing device Ethernet connection 305, a docking station Ethernet connection 307, and docking station Firewire, USB, Ethernet and power ports 309, 311, 313 and 315, respectively. The docking station 303 may comprise suitable circuitry, logic and/or code to accept signals from the Firewire, USB, Ethernet, and/or power ports 309, 311 and 313, respectively, and communicate these signals to the portable computing device 301.

In operation, the portable computing device 301 may be coupled to the docking station 303 utilizing the portable computing device Ethernet connection 305 and the docking station Ethernet connection 307. Data communicated through the portable computing device and docking station Ethernet connections 305 and 307 may adhere to the IEEE Ethernet standard. In accordance with an embodiment of the invention, information comprising control data and/or regular data flowing between the portable computing device 301 and the docking station 303 via the portable computing device Ethernet connection 305 and the docking station Ethernet connection 307 may be packetized into Ethernet frames, which may carry text, video, voice and/or multi-media information. The different types of data exchanged between the portable computing device 301 and the docking station 303 may be assigned to different levels of QoS (Quality of Service) and CoS (Class of Services) to ensure proper level of functionality and appropriate control over latency and bandwidth requirements. Power may be supplied to the portable computing device 301 via the docking station Ethernet connection 307 and portable computing device Ethernet connection 305 for supply and/or charging purposes.

Figure 4:
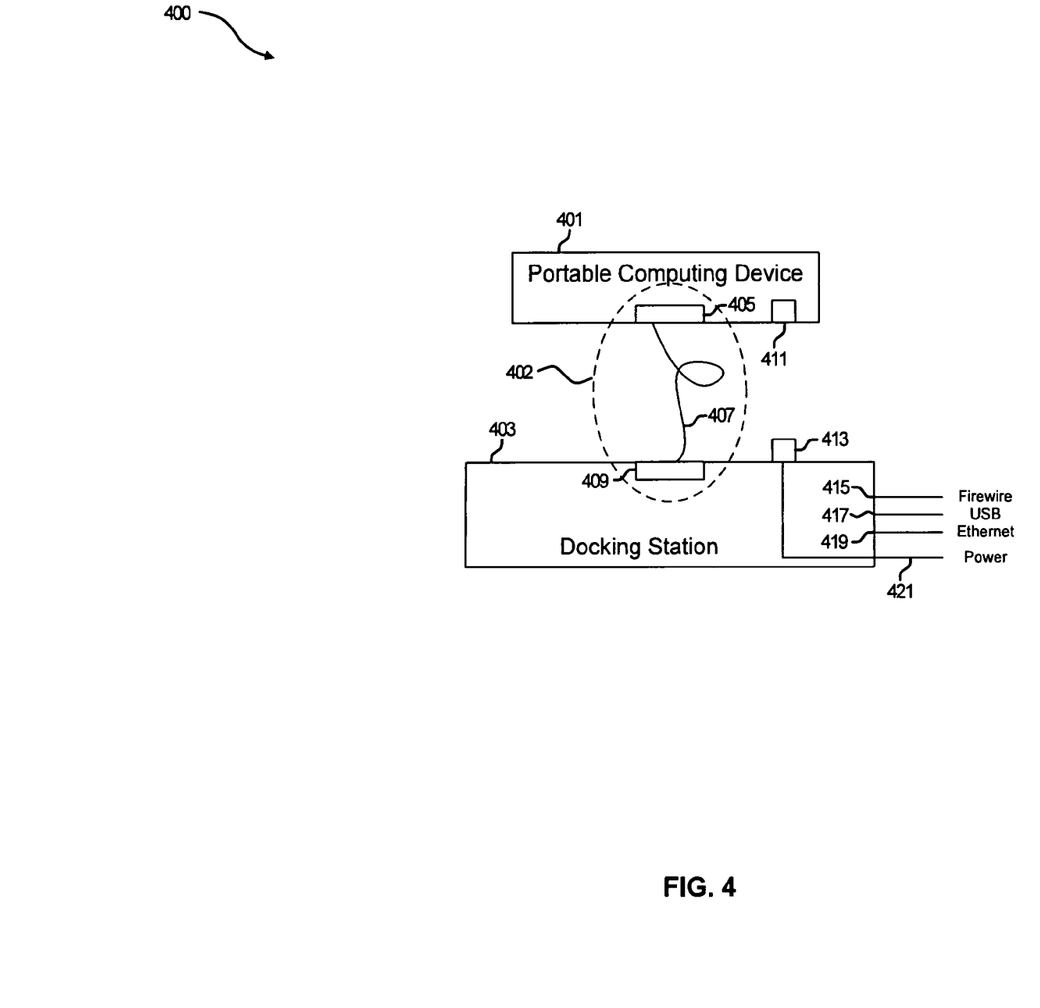
FIG. 4 is a block diagram that illustrates coupling of a portable computing device to a docking station using an Ethernet Interface 402 with an Ethernet cable and a separate power connector, in accordance with an embodiment of the invention.

FIG. 4 is a block diagram that illustrates coupling of a portable computing device to a docking station using an Ethernet Interface 402 with an Ethernet cable and a separate power connector, in accordance with an embodiment of the invention. Referring to FIG. 4, there is shown a portable computing device docking station configuration 400 comprising a portable computing device 401, a docking station 403, a portable computing device Ethernet connection 405, an Ethernet cable 407, a docking station Ethernet connection 409, a portable computing device power connector 411, a docking station power connector 413, and docking station Firewire, USB, Ethernet and power ports 415, 417, 419 and 421, respectively. The docking station 403 may comprise suitable circuitry, logic and/or code to accept signals from the Firewire, USB, Ethernet, and/or power ports 415, 417 and 419, respectively, and communicate these signals to the portable computing device 401 via connectors 409 and 413.

In operation, the portable computing device 401 may be coupled to the docking station 403 utilizing the portable computing device Ethernet connection 405, the Ethernet cable 407 and the docking station Ethernet connection 409. Data communicated through the Ethernet connections 405 and 409 and the Ethernet cable 407 may be IEEE Ethernet standard compliant. In accordance with an embodiment of the invention, information comprising control data and/or regular data flowing between the portable computing device 401 and the docking station 403 via the portable computing device Ethernet connection 405, the Ethernet cable 407 and the docking station Ethernet connection 409 may be packetized into Ethernet frames, which may carry text, video, voice and/or multi-media information. The different types of data exchanged between the portable computing device 401 and the docking station 403 may be assigned to different levels of QoS (Quality of Service) and CoS (Class of Services) to ensure proper level of functionality and appropriate control over latency and bandwidth requirements. Power may be supplied to the portable computing device 401 via the docking station power connector 413 and portable computing device power connector 411.

Figure 5:
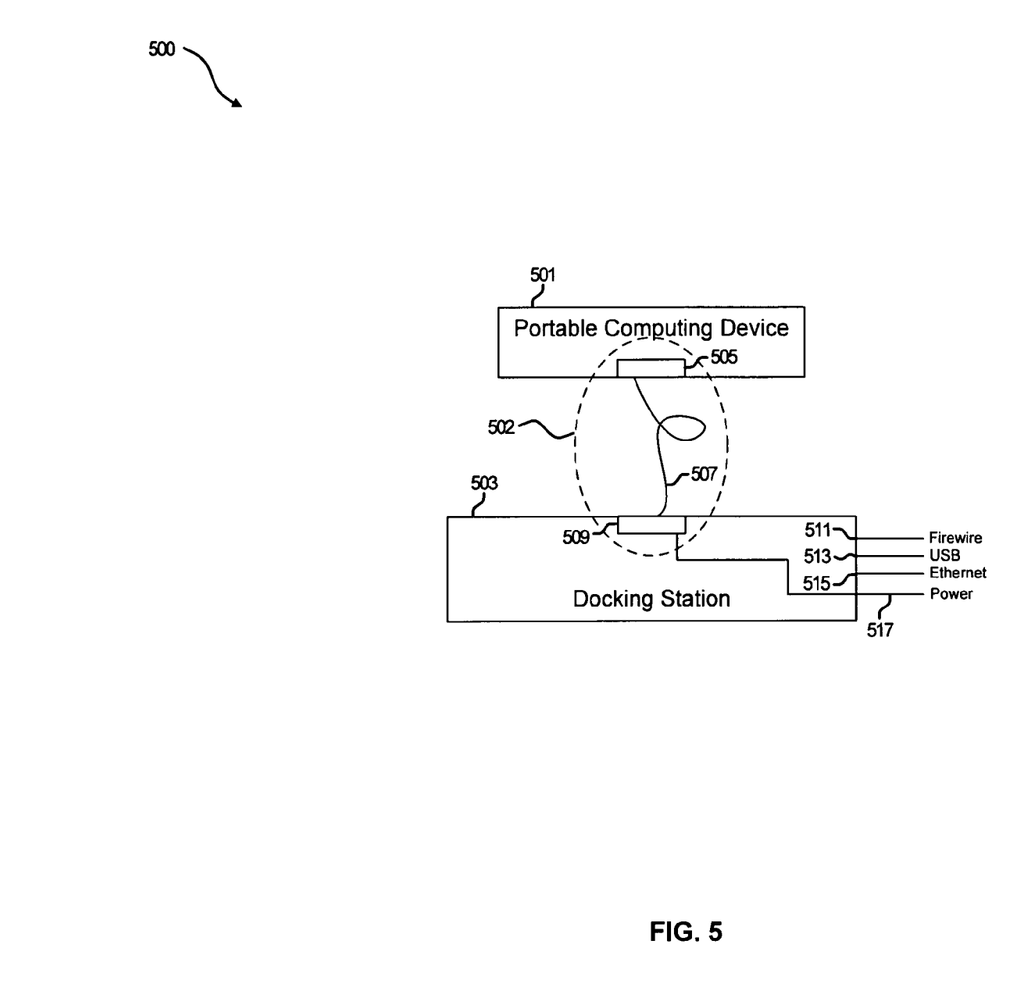
FIG. 5 is a block diagram that illustrates coupling of a portable computing device to a docking station using an Ethernet Interface 502 with an Ethernet cable in which power is supplied via the Ethernet interface 502 and Ethernet cable, in accordance with an embodiment of the invention.

FIG. 5 is a block diagram that illustrates coupling of a portable computing device to a docking station using an Ethernet Interface 502 with an Ethernet cable in which power is supplied via the Ethernet interface and Ethernet cable, in accordance with an embodiment of the invention. Referring to FIG. 5, there is shown a portable computing device docking station configuration 500 comprising a portable computing device 501, a docking station 503, a portable computing device Ethernet connection 505, an Ethernet cable 507, a docking station Ethernet connection 509 and docking station Firewire, USB, Ethernet and power ports 511, 513, 515 and 517, respectively. The docking station 503 may comprise suitable circuitry, logic and/or code to accept signals from the Firewire, USB, Ethernet, and/or power ports 511, 513 and 515, respectively, and communicate these signals to the portable computing device 501 via connection 509.

In operation, the portable computing device 501 may be coupled to the docking station 503 utilizing the portable computing device Ethernet connection 505, the Ethernet cable 507 and the docking station Ethernet connection 509. Data communicated through the Ethernet connections 505 and 509 and the Ethernet cable 507 may be IEEE Ethernet standard compliant. In accordance with an embodiment of the invention, information comprising control data and/or regular data flowing between the portable computing device 501 and the docking station 503 via the portable computing device Ethernet connection 505, the Ethernet cable 507 and the docking station Ethernet connection 509 may be packetized into Ethernet frames, which may carry text, video, voice and/or multimedia information. The different types of data exchanged between the portable computing device 501 and the docking station 503 may be assigned to different levels of QoS (Quality of Service) and CoS (Class of Services) to ensure proper level of functionality and appropriate control over latency and bandwidth requirements. Power may be supplied to the portable computing device 501 via the docking station Ethernet connection 509 and portable computing device Ethernet connection 505 for supply and/or charging purposes.

Figure 6:
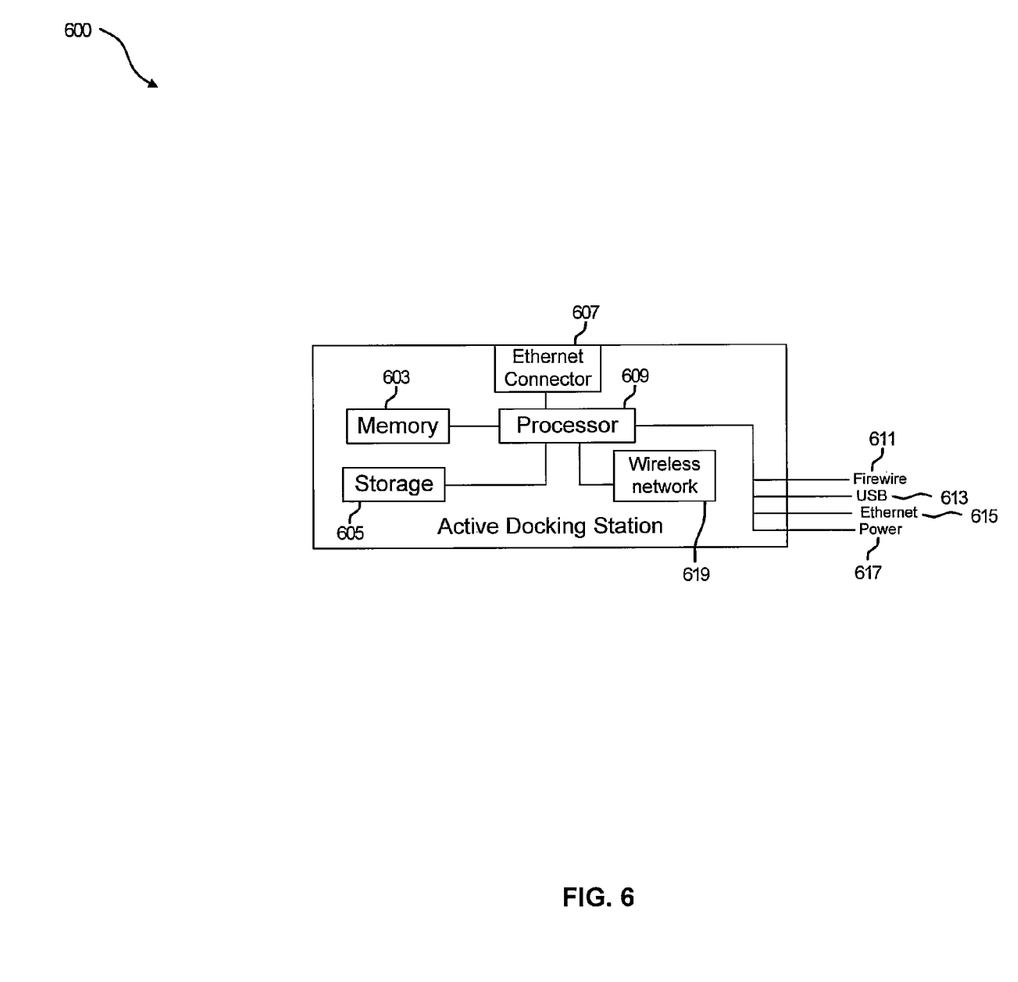
FIG. 6 is a block diagram that illustrates an active docking station in accordance with an embodiment of the invention.

FIG. 6 is a block diagram that illustrates an active docking station in accordance with an embodiment of the invention. Referring to FIG. 6 there is shown active docking station 600 comprising a memory 603, a storage 605, an Ethernet connection 607, a processor 609, a wireless network circuit 619 and external Firewire, USB, Ethernet, and power connections 611, 613, 615 and 617, respectively. The memory 603 may comprise suitable circuitry, logic and/or code for storing instructions or other code that may be utilized by the processor 609. The processor 609 may comprise suitable logic, circuitry, and/or code that may enable control and/or data processing operations for the active docking station 600. The storage 605 may comprise suitable circuitry, logic and/or code for storing data that may be accessed by the processor 609 and a portable computing device or other external computing device that may interface with the active docking station 600 via the Ethernet connection 607 or via a wireless network. The wireless network circuit 619 may comprise suitable circuitry, logic and/or code that may be enabled for wireless communication between the active docking station 600 and a wireless network.

In operation, the active docking station 600 may communicate with external networks or devices via external connections 611, 613, 615 and 617 and/or the wireless network circuit 619, independent of whether a device is docked into the active docking station 600. Data may be stored on the storage 605 within the active docking station 600 that may be accessed by a portable computing device interfaced via the Ethernet connection 607. In other words, the active station 600 may be accessible by other devices even when no portable computing device is connected to the Ethernet connection 607.

In an embodiment of the invention, a method and system are disclosed for interfacing a portable computing device 301 to a docking station 303 using an Ethernet connection 307. Power may be applied from the docking station 303 to the portable computing device 301 via the Ethernet connection 307 using power over Ethernet (POE) protocol. Audio, video, multimedia, control and/or data signals may be communicated between the docking station 303 and the portable computing device 301 via the Ethernet connection 307. Data exchanged between the portable computing device 301 and the docking station 303 may be encapsulated in Ethernet frames and tagged appropriately. The interface may be accomplished by directly coupling an Ethernet connection 307 of the docking station 303 to an Ethernet connection 305 of the portable computing device 301, or by utilizing an Ethernet cable 507. The docking station 203, 303, 403 and/or 503 may be an active docking station or a passive docking station. The Ethernet link may be established at 10 Mbps, 100 Mbps, 1 Gbps, 2.5 Gbps, 10 Gbps, or other suitable speeds.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for docking a computer, the method comprising:
   interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
   supplying power from said docking station to said laptop computer or handheld communication device via said Ethernet interface.

2. The method according to claim 1, comprising powering said laptop computer or handheld communication device via said Ethernet interface using power over Ethernet (POE) protocol.

3. The method according to claim 1, comprising communicating audio signals between said docking station and said laptop computer or handheld communication device via said Ethernet interface.

4. The method according to claim 1, comprising communicating video signals between said docking station and said laptop computer or handheld communication device via said Ethernet interface.

5. The method according to claim 1, comprising communicating multimedia signals between said docking station and said laptop computer or handheld communication device via said Ethernet interface.

6. The method according to claim 1, comprising communicating control signals between said docking station and said laptop computer or handheld communication device via said Ethernet interface.

7. The method according to claim 1, comprising communicating data signals between said docking station and said laptop computer or handheld communication device via said Ethernet interface.

8. The method according to claim 1, wherein said interfacing comprises directly coupling said corresponding RJ-45 Ethernet connector on said docking station to said RJ-45 Ethernet connector on said laptop computer or handheld communication device.

9. The method according to claim 1, wherein said interfacing comprises coupling said corresponding RJ-45 Ethernet connector on said docking station to said RJ-45 Ethernet connector on said laptop computer or handheld communication device via an Ethernet cable.

10. The method according to claim 1, wherein said docking station is an active docking station.

11. The method according to claim 1, wherein said docking station is a passive docking station.

12. The method according to claim 1, comprising charging said laptop computer or handheld communication device via said Ethernet interface using power over Ethernet (POE) protocol.

13. The method according to claim 1, comprising encapsulating and tagging data exchanged between said laptop computer or handheld communication device and said docking station.

14. The method according to claim 1, comprising communicating data generated from human interface devices between said docking station and said laptop computer or handheld communication device via said Ethernet interface.

15. A system for docking a computer, the system comprising:
   one or more circuits for interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
   said one or more circuits for supplying power from said docking station to said laptop computer or handheld communication device via said Ethernet interface.

16. The system according to claim 15, wherein said one or more circuits powers said laptop computer or handheld communication device via said Ethernet interface using power over Ethernet (POE) protocol.

17. The system according to claim 15, wherein said one or more circuits communicates audio signals between said docking station and said laptop computer or handheld communication device via said Ethernet interface.

18. The system according to claim 15, wherein said one or more circuits communicates video signals between said docking station and said laptop computer or handheld communication device via said Ethernet interface.

19. The system according to claim 15, wherein said one or more circuits communicates multimedia signals between said docking station and said laptop computer or handheld communication device via said Ethernet interface.

20. The system according to claim 15, wherein said one or more circuits communicates control signals between said docking station and said laptop computer or handheld communication device via said Ethernet interface.

21. The system according to claim 15, wherein said one or more circuits communicates data signals between said docking station and said laptop computer or handheld communication device via said Ethernet interface.

22. The system according to claim 15, wherein said corresponding RJ-45 Ethernet connector of said docking station couples directly an to said RJ-45 Ethernet connector on said laptop computer or handheld communication device.

23. The system according to claim 15, wherein said corresponding RJ-45 Ethernet connector of said docking station couples to said Ethernet connector on said laptop computer or handheld communication device via an Ethernet cable.

24. The system according to claim 15, wherein said docking station is an active docking station.

25. The system according to claim 15, wherein said docking station is a passive docking station.

26. The system according to claim 15, wherein said one or more circuits charges said laptop computer or handheld communication device via said Ethernet interface using power over Ethernet (POE) protocol.

27. The system according to claim 15, wherein said one or more circuits encapsulates and tags data exchanged between said laptop computer or handheld communication device and said docking station.

28. The system according to claim 15, wherein said one or more circuits communicates data generated from human interface devices between said docking station and said laptop computer or handheld communication device via said Ethernet interface.

29. A method for docking a computer, the method comprising:
   interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
   powering said laptop computer or handheld communication device via said Ethernet interface using power over Ethernet (POE) protocol.

30. The method according to claim 29, comprising communicating audio signals between said docking station and said laptop computer or handheld communication device via said Ethernet interface.

31. The method according to claim 29, comprising communicating video signals between said docking station and said laptop computer or handheld communication device via said Ethernet interface.

32. The method according to claim 29, comprising communicating multimedia signals between said docking station and said laptop computer or handheld communication device via said Ethernet interface.

33. The method according to claim 29, comprising communicating control signals between said docking station and said laptop computer or handheld communication device via said Ethernet interface.

34. The method according to claim 29, comprising communicating data signals between said docking station and said laptop computer or handheld communication device via said Ethernet interface.

35. The method according to claim 29, wherein said interfacing comprises directly coupling said corresponding RJ-45 Ethernet connector on said docking station to said RJ-45 Ethernet connector on said laptop computer or handheld communication device.

36. The method according to claim 29, wherein said interfacing comprises coupling said corresponding RJ-45 Ethernet connector on said docking station to said RJ-45 Ethernet connector on said laptop computer or handheld communication device via an Ethernet cable.

37. The method according to claim 29, wherein said docking station is an active docking station.

38. The method according to claim 29, wherein said docking station is a passive docking station.

39. The method according to claim 29, comprising charging said laptop computer or handheld communication device via said Ethernet interface using power over Ethernet (POE) protocol.

40. The method according to claim 29, comprising encapsulating and tagging data exchanged between said laptop computer or handheld communication device and said docking station.

41. The method according to claim 29, comprising communicating data generated from human interface devices between said docking station and said laptop computer or handheld communication device via said Ethernet interface.

42. A system for docking a computer, the system comprising:
one or more circuits for interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
said one or more circuits for powering said laptop computer or handheld communication device via said Ethernet interface using power over Ethernet (POE) protocol.

43. The system according to claim 42, wherein said one or more circuits communicates audio signals between said docking station and said laptop computer or handheld communication device via said Ethernet interface.

44. The system according to claim 42, wherein said one or more circuits communicates video signals between said docking station and said laptop computer or handheld communication device via said Ethernet interface.

45. The system according to claim 42, wherein said one or more circuits communicates multimedia signals between said docking station and said laptop computer or handheld communication device via said Ethernet interface.

46. The system according to claim 42, wherein said one or more circuits communicates control signals between said docking station and said laptop computer or handheld communication device via said Ethernet interface.

47. The system according to claim 42, wherein said one or more circuits communicates data signals between said docking station and said laptop computer or handheld communication device via said Ethernet interface.

48. The system according to claim 42, wherein said corresponding RJ-45 Ethernet connector of said docking station couples directly an to said RJ-45 Ethernet connector on said laptop computer or handheld communication device.

49. The system according to claim 42, wherein said corresponding RJ-45 Ethernet connector of said docking station couples to said Ethernet connector on said laptop computer or handheld communication device via an Ethernet cable.

50. The system according to claim 42, wherein said docking station is an active docking station.

51. The system according to claim 42, wherein said docking station is a passive docking station.

52. The system according to claim 42, wherein said one or more circuits charges said laptop computer or handheld communication device via said Ethernet interface using power over Ethernet (POE) protocol.

53. The system according to claim 42, wherein said one or more circuits encapsulates and tags data exchanged between said laptop computer or handheld communication device and said docking station.

54. The system according to claim 42, wherein said one or more circuits communicates data generated from human interface devices between said docking station and said laptop computer or handheld communication device via said Ethernet interface.

55. A method for docking a computer, the method comprising:
interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
wherein said docking station is a passive docking station.

56. The method according to claim 55, comprising communicating audio signals between said docking station and said laptop computer or handheld communication device via said Ethernet interface.

57. The method according to claim 55, comprising communicating video signals between said docking station and said laptop computer or handheld communication device via said Ethernet interface.

58. The method according to claim 55, comprising communicating multimedia signals between said docking station and said laptop computer or handheld communication device via said Ethernet interface.

59. The method according to claim 55, comprising communicating control signals between said docking station and said laptop computer or handheld communication device via said Ethernet interface.

60. The method according to claim 55, comprising communicating data signals between said docking station and said laptop computer or handheld communication device via said Ethernet interface.

61. The method according to claim 55, wherein said interfacing comprises directly coupling said corresponding RJ-45 Ethernet connector on said docking station to said RJ-45 Ethernet connector on said laptop computer or handheld communication device.

62. The method according to claim 55, wherein said interfacing comprises coupling said corresponding RJ-45 Ethernet connector on said docking station to said RJ-45 Ethernet connector on said laptop computer or handheld communication device via an Ethernet cable.

63. The method according to claim 55, comprising charging said laptop computer or handheld communication device via said Ethernet interface using power over Ethernet (POE) protocol.

64. The method according to claim 55, comprising encapsulating and tagging data exchanged between said laptop computer or handheld communication device and said docking station.

65. The method according to claim 55, comprising communicating data generated from human interface devices between said docking station and said laptop computer or handheld communication device via said Ethernet interface.

66. A system for docking a computer, the system comprising:
one or more circuits for interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
wherein said docking station is a passive docking station.

67. The system according to claim 66, wherein said one or more circuits communicates audio signals between said docking station and said laptop computer or handheld communication device via said Ethernet interface.

68. The system according to claim 66, wherein said one or more circuits communicates video signals between said docking station and said laptop computer or handheld communication device via said Ethernet interface.

69. The system according to claim 66, wherein said one or more circuits communicates multimedia signals between said docking station and said laptop computer or handheld communication device via said Ethernet interface.

70. The system according to claim 66, wherein said one or more circuits communicates control signals between said docking station and said laptop computer or handheld communication device via said Ethernet interface.

71. The system according to claim 66, wherein said one or more circuits communicates data signals between said docking station and said laptop computer or handheld communication device via said Ethernet interface.

72. The system according to claim 66, wherein said corresponding RJ-45 Ethernet connector of said docking station couples directly an to said RJ-45 Ethernet connector on said laptop computer or handheld communication device.

73. The system according to claim 66, wherein said corresponding RJ-45 Ethernet connector of said docking station couples to said Ethernet connector on said laptop computer or handheld communication device via an Ethernet cable.

74. The system according to claim 66, wherein said one or more circuits charges said laptop computer or handheld communication device via said Ethernet interface using power over Ethernet (POE) protocol.

75. The system according to claim 66, wherein said one or more circuits encapsulates and tags data exchanged between said laptop computer or handheld communication device and said docking station.

76. The system according to claim 66, wherein said one or more circuits communicates data generated from human interface devices between said docking station and said laptop computer or handheld communication device via said Ethernet interface.

77. A method for docking a computer, the method comprising:
interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and
charging said laptop computer or handheld communication device via said Ethernet interface using power over Ethernet (POE) protocol.

78. The method according to claim 77, comprising communicating audio signals between said docking station and said laptop computer or handheld communication device via said Ethernet interface.

79. The method according to claim 77, comprising communicating video signals between said docking station and said laptop computer or handheld communication device via said Ethernet interface.

80. The method according to claim 77, comprising communicating multimedia signals between said docking station and said laptop computer or handheld communication device via said Ethernet interface.

81. The method according to claim 77, comprising communicating control signals between said docking station and said laptop computer or handheld communication device via said Ethernet interface.

82. The method according to claim 77, comprising communicating data signals between said docking station and said laptop computer or handheld communication device via said Ethernet interface.

83. The method according to claim 77, wherein said interfacing comprises directly coupling said corresponding RJ-45 Ethernet connector on said docking station to said RJ-45 Ethernet connector on said laptop computer or handheld communication device.

84. The method according to claim 77, wherein said interfacing comprises coupling said corresponding RJ-45 Ethernet connector on said docking station to said RJ-45 Ethernet connector on said laptop computer or handheld communication device via an Ethernet cable.

85. The method according to claim 77, wherein said docking station is an active docking station.

86. The method according to claim 77, comprising encapsulating and tagging data exchanged between said laptop computer or handheld communication device and said docking station.

87. The method according to claim 77, comprising communicating data generated from human interface devices between said docking station and said laptop computer or handheld communication device via said Ethernet interface.

88. A system for docking a computer, the system comprising:
one or more circuits for interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station;

said one or more circuits for charging said laptop computer or handheld communication device via said Ethernet interface using power over Ethernet (POE) protocol.

89. The system according to claim 88, wherein said one or more circuits communicates audio signals between said docking station and said laptop computer or handheld communication device via said Ethernet interface.

90. The system according to claim 88, wherein said one or more circuits communicates video signals between said docking station and said laptop computer or handheld communication device via said Ethernet interface.

91. The system according to claim 88, wherein said one or more circuits communicates multimedia signals between said docking station and said laptop computer or handheld communication device via said Ethernet interface.

92. The system according to claim 88, wherein said one or more circuits communicates control signals between said docking station and said laptop computer or handheld communication device via said Ethernet interface.

93. The system according to claim 88, wherein said one or more circuits communicates data signals between said docking station and said laptop computer or handheld communication device via said Ethernet interface.

94. The system according to claim 88, wherein said corresponding RJ-45 Ethernet connector of said docking station couples directly an to said RJ-45 Ethernet connector on said laptop computer or handheld communication device.

95. The system according to claim 88, wherein said corresponding RJ-45 Ethernet connector of said docking station couples to said Ethernet connector on said laptop computer or handheld communication device via an Ethernet cable.

96. The system according to claim 88, wherein said docking station is an active docking station.

97. The system according to claim 88, wherein said one or more circuits encapsulates and tags data exchanged between said laptop computer or handheld communication device and said docking station.

98. The system according to claim 88, wherein said one or more circuits communicates data generated from human interface devices between said docking station and said laptop computer or handheld communication device via said Ethernet interface.

99. A method for docking a computer, the method comprising:

interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and encapsulating and tagging data exchanged between said laptop computer or handheld communication device and said docking station.

100. The method according to claim 99, comprising communicating audio signals between said docking station and said laptop computer or handheld communication device via said Ethernet interface.

101. The method according to claim 99, comprising communicating video signals between said docking station and said laptop computer or handheld communication device via said Ethernet interface.

102. The method according to claim 99, comprising communicating multimedia signals between said docking station and said laptop computer or handheld communication device via said Ethernet interface.

103. The method according to claim 99, comprising communicating control signals between said docking station and said laptop computer or handheld communication device via said Ethernet interface.

104. The method according to claim 99, comprising communicating data signals between said docking station and said laptop computer or handheld communication device via said Ethernet interface.

105. The method according to claim 99, wherein said interfacing comprises directly coupling said corresponding RJ-45 Ethernet connector on said docking station to said RJ-45 Ethernet connector on said laptop computer or handheld communication device.

106. The method according to claim 99, wherein said interfacing comprises coupling said corresponding RJ-45 Ethernet connector on said docking station to said RJ-45 Ethernet connector on said laptop computer or handheld communication device via an Ethernet cable.

107. The method according to claim 99, wherein said docking station is an active docking station.

108. The method according to claim 99, comprising communicating data generated from human interface devices between said docking station and said laptop computer or handheld communication device via said Ethernet interface.

109. A system for docking a computer, the system comprising:

one or more circuits for interfacing a laptop computer or handheld communication device to a docking station using an Ethernet interface, wherein said Ethernet interface comprises an RJ-45 Ethernet connector on said laptop computer or handheld communication device and a corresponding RJ-45 Ethernet connector on said docking station; and said one or more circuits for encapsulating and tagging data exchanged between said laptop computer or handheld communication device and said docking station.

110. The system according to claim 109, wherein said one or more circuits communicates audio signals between said docking station and said laptop computer or handheld communication device via said Ethernet interface.

111. The system according to claim 109, wherein said one or more circuits communicates video signals between said docking station and said laptop computer or handheld communication device via said Ethernet interface.

112. The system according to claim 109, wherein said one or more circuits communicates multimedia signals between said docking station and said laptop computer or handheld communication device via said Ethernet interface.

113. The system according to claim 109, wherein said one or more circuits communicates control signals between said docking station and said laptop computer or handheld communication device via said Ethernet interface.

114. The system according to claim 109, wherein said one or more circuits communicates data signals between said docking station and said laptop computer or handheld communication device via said Ethernet interface.

115. The system according to claim 109, wherein said corresponding RJ-45 Ethernet connector of said docking station couples directly an to said RJ-45 Ethernet connector on said laptop computer or handheld communication device.

116. The system according to claim 109, wherein said corresponding RJ-45 Ethernet connector of said docking station couples to said Ethernet connector on said laptop computer or handheld communication device via an Ethernet cable.

117. The system according to claim 109, wherein said docking station is an active docking station.

118. The system according to claim 109, wherein said one or more circuits communicates data generated from human interface devices between said docking station and said laptop computer or handheld communication device via said Ethernet interface.

* * * * *